(12) United States Patent
Ronin et al.

(10) Patent No.: US 7,669,790 B2
(45) Date of Patent: Mar. 2, 2010

(54) METHOD FOR PROCESSING OF POZZOLANS

(75) Inventors: Vladimir Ronin, Luleå (SE); Clinton W Pike, Sr., Cypress, TX (US); Igor Ronin, Luleå (SE)

(73) Assignee: Procedo Enterprises Establissement, Vaduz (LI)

( * ) Notice: Subject to any disclaimer, the term of this patent is extended or adjusted under 35 U.S.C. 154(b) by 163 days.

(21) Appl. No.: 11/942,891

(22) Filed: Nov. 20, 2007

(65) Prior Publication Data

US 2009/0121052 A1    May 14, 2009

(30) Foreign Application Priority Data

Nov. 12, 2007   (SE) .................................... 0702483

(51) Int. Cl.
*B02C 19/00* (2006.01)

(52) U.S. Cl. .......................... 241/22; 241/24.1; 241/29; 241/30

(58) Field of Classification Search ................... 241/22, 241/29, 30, 24.1, 24.31, 24.23
See application file for complete search history.

(56) References Cited

U.S. PATENT DOCUMENTS

2006/0201395 A1* 9/2006 Barger et al. ................ 106/705

* cited by examiner

*Primary Examiner*—Mark Rosenbaum
(74) *Attorney, Agent, or Firm*—Young & Thompson

(57) ABSTRACT

Method for processing of pozzolans comprising fly ash such as Class F and/or Class C fly ash used for preparation of mortars and concretes, characterized in, that the pozzolans is subjected to a high energetic mechanical processing by means of grinding in a grinding equipment to a fineness of the final product with a retention on a sieve 30 microns being less than 5%, whereby the pozzolan particles receive mechanical impulses when non-cenosphere in the form of coarse scoria particles are disintegrated and whereby the surface of cenosphere grinded particles is activated.

13 Claims, No Drawings

METHOD FOR PROCESSING OF POZZOLANS

The present invention relates to a method for processing of pozzolans in the form of fly ash.

Fly ash is useful for production of concretes, mortars and other mixtures comprising cement. Fly ash is a by-product of coal burning power plants and is produced worldwide in large quantities each year.

The present method eliminates fluctuations in the fly ash quality due to variations in the coal chemical compositions and parameters of coal burning processes. Processing of pozzolans, i.e. fly ashes according to the present method significantly improves performance of the concrete and provides higher level of replacement of Standard Portland cement, which leads to significant economical and environmental benefits.

Fly ash usually contains about 85% glassy, amorphous components in the form of cenosphere particles. According to ASTM C 618 fly ash is classified in two classes, Class C and Class F. The Class F fly ash typically contains more than 70% by weight of silica, alumina, and ferric oxides, while Class C typically contains between 10% and 50%. Class F is produced as a by product of the combustion of bituminous coal. Class C fly ash has a higher calcium content and is produced as a by-product of the combustion of sub-bituminous coal.

According to American Coal Ash Association, approximately 73 million tons of coal ash was produced in the U.S. in the form of fly ash in 2006 and only about 45% has been used for different industrial applications while the remaining portion is mostly deposited as waste in landfills. Replacement of Portland cement in concrete in the US is presently only about 10 percent.

Comprehensive research has demonstrated that a high volume fly ash concretes, where Portland cement has been replaced by fly ash to a level ever 50% showed a higher long term strength development, a lower water and a gas permeability, a high chloride ion resistance, etc. in comparison with Portland cement concretes without fly ash.

At the same time a high volume fly ash concrete has significant drawbacks. One drawback is very long setting times and a very slow strength development during the period 0 to 28 days, especially with a water-to-cementitious ratios higher than 0.50. These negative effects reduce the level of fly ash used for replacement of Portland cement to an average of 15-20%.

Serious problems are also related to the stability of fly ash quality. Usually variations in the chemical composition of the used coal and frequently changed operating parameters of the boilers cause formation of crystalline and quasi-crystalline phases, so called scoria, which leads to reduction in fly ash reactivity, so called pozzolanic activity.

Several efforts has been made towards improvement of the performance of high volume fly ash concretes, e.g. Malhotra, Concrete International J., Vol. 21, No 5, May 1999, pp. 61-66. According to Malhotra strength development of such concretes could be improved by significantly increasing the binder content, i.e. cement and microfiller, and vastly decreasing the amount of water, but such an approach requires an increased dosage of water reducing admixtures to keep an acceptable consistency of concrete mixtures, which sharply increases the cost of the concrete.

A number of methods related to grinding fly ash have been developed in order to improve its pozzolanic activity by grinding, which increase the amount of fly ash particles of the size about 11 microns and by simultaneous introduction of calcium oxide. Such methods are described in U.S. Pat. Nos. 6,818,058, 6,038,987, 5,714,002, 5,714,003, 5,383,521 and 5,121,795, All mentioned known methods either cannot provide significant improvement of the fly ash performance as a concrete component, or cannot avoid fluctuations of the fly ash properties and guarantee the constant quality of the final product.

The present invention solves said problems.

The present invention thus refers to a method for processing of pozzolans comprising fly ash, such as Class F and/or Class C fly ash, used for preparation of mortars and concretes, characterized in, that the pozzolans is subjected to a high energetic mechanical processing by means of grinding in a grinding equipment to a fineness of the final product with a retention on a sieve 30 microns being less than 5%, whereby the pozzolan particles receive mechanical impulses when non-cenosphere in the form of coarse scoria particles are disintegrated and whereby the surface of cenosphsre grinded particles is activated.

The present invention can be realized with the use of different type of grinding equipment such as media milling equipment, e.g. stirred, centrifugal, tumbling ball or non-media milling equipment, e.g. jet, impact, roller with dominating shear mechanical impulses applied to the particles subjected to processing and combined with air classification.

According to a preferred embodiment of the present invention the pozzolan is subjected to a pre-classification to separate a fraction with a retention on the sieve 45 microns which is at least 90% and in that the oversized particles are grinded to a fineness with a retention on the sieve 30 microns less than 5% to achieve a strength according to the pozzolanic index A5TM C 618 after $28d$ days which is $\geq 75\%$.

According to another preferred embodiment of the invention the pozzolan is subjected to a pre-classification to separate a fraction with a retention on the sieve 45 microns which is at least 95% and in that the oversized particles are grinded to a fineness with a retention on the sieve 30 microns which is less than 5%.

According to still another preferred embodiment of the invention the pozzolan is subjected to a pre-classification to separate a fraction with a retention on the sieve 45 microns which is at least 99% and in that the oversized particles are grinded to a fineness with a retention on the sieve 30 microns which is less than 5%.

According to yet another preferred, embodiment of the invention the pozzolan, after said pre-classification, is subjected to an intergrinding to a fineness with a retention on the sieve 30 microns which is less than 5%.

According to a much preferred embodiment of the invention pozzolan subjected to a grinding, so that the final product has the following particle size distribution:

$\leq$ 5 microns 15-25%,
$\leq$ 10 microns 30-40% %,
$\leq$ 30 microns 90-95%.

The pozzolan treated according to the invention can be further treated by adding Portland cement. According to one preferred embodiment of the invention Portland cement is added in the amount up to 10% by weight to the said pozzolan during or after said processing of the pozzolan.

It is also preferred to add water reducing agents, set time regulators, and/or strength accelerating admixtures in powder form to the said, pozzolan during or after said processing of the pozzolan.

The main advantage of the present invention is that the proposed, processing of fly ash minimizes the effects of coal variations and boiler conditions on fly ash properties. Another advantage is possibility to increase of replacement of Portland cement in concrete, which significantly reduces green gas emissions and energy consumption associated with Portland cement production.

EXAMPLES

Class F fly ash according to ASTM C with chemical composition and particle size distribution (PSD) represented by the table 1 and 2 was tested according to this invention.

TABLE 1

Chemical composition

| Compound | Fly Ash |
|---|---|
| CaO | 15.0% |
| $SiO_2$ | 49.4% |
| $Al_2O_3$ | 19.6% |
| $Fe_2O_3$ | 5.2% |
| $SO_3$ | 0.8% |
| $Na_2O$ | 0.3% |
| $K_2O$ | 1.2% |

TABLE 2

Particle size distribution

| Parameter | Fly ash |
|---|---|
| Median Particle size (μm) | 15.2 |
| Max Particle size (μm) | 120 |
| Retained on 325 Mesh (45 μm), % | 22 |

Table 3 below represents the strength development according to ASTM C 109 of 50/50 by weight blends of Portland cement (Type 1 according to ASTM C 150) and supplementary cementitious materials (SCM) unprocessed and processed according to the present invention.

TABLE 3

Compressive Strength Development, MPa (psi)

| | Curing time, days | | | |
|---|---|---|---|---|
| Type of SCM | 1 | 3 | 7 | 28 |
| 1. Unprocessed scoria after classification (95% coarser 45 microns) | 2.5 (364) | 4.3 (630) | 5.8 (842) | 9.0 (1315) |
| 2. Processed scoria after classification (95% finer than 30 microns) | 6.6 (962) | 14.3 (2079) | 20.1 (2903) | 28.7 (4158) |
| 3. Processed fly ash with processed scoria (final product 95% finer than 30 microns) | 8.8 (1269) | 19.1 (2769) | 27.0 (3911) | 35.2 (5108) |
| 4. 50/50 blend of Type I cement and blast furnace slag, (Blaine 4000 cm2/g) | | | 25-28 MPa | 30-38 MPa |

The obtained tests results show that the present invention transforms a completely inert coarse fraction of the fly ash, with zero pozzolanic activity, into a reactive part, which has a significant contribution to the strength. Blended cement containing 50% Portland cement and 50% of the fly ash processed according to the present invention demonstrated with 28 days curing time a strength in line with the average strengths experienced with Type I cements which is 35 MPa-40 MPa, and its 50/50 blend with high quality blast furnace slag.

Additionally to the significant performance benefits as high durability, etc the present invention also has a big environmental impact making available for the concrete production low active ashes, which are usually landfiled.

Several embodiments of the invention have been described above. However, the present invention is not restricted to exemplifying embodiments described above, but can be varied within the scope of the claims.

The invention claimed is:

1. A method of processing of pozzolan particles comprising fly ash including Class F and/or Class C fly ash used for preparation of mortars and concretes, comprising the steps of:
   using grinding equipment, subjecting the pozzolan particles to a high energetic mechanical processing of grinding with the pozzolan particles receiving mechanical impulses, wherein,
   non-cenospheres in the form of coarse scoria particles are disintegrated and the surface of resulting cenosphere grinded particles is activated, and
   the grinding produces a final product having the following particle size distribution:
   <5 microns 15-25%,
   <10 microns 30-40%, and
   <30 microns 90-95%.

2. The method according to claim 1, comprising the further step of subjecting the pozzolan particles to a pre-classification to separate a fraction with a retention on the sieve 45 microns which is at least 90% and the oversized particles are grinded to a fineness with a retention on the sieve 30 microns less than 5% to achieve a strength according to the pozzolanic index ASTM C 618 after 28 days which is ≧75%.

3. The method according to claim 2, comprising the further step of adding Portland cement in the amount up to 10% by weight to the pozzolan particles during or after said grinding of the pozzolan particles.

4. The method according to claim 2, comprising the further step of adding at least one of water reducing agents, set time regulators, and strength accelerating admixtures in powder form to the pozzolan particles during or after said grinding of the pozzolan particles.

5. The method according to claim 1 comprising the further step of subjecting the pozzolan particles to a pre-classification to separate a fraction with a retention on the sieve 45 microns which is at least 95 % and the oversized particles are grinded to a fineness with a retention on the sieve 30 microns which is less than 5 %.

6. The method according to claim 5, comprising the further step of adding Portland cement in the amount up to 10% by weight to the pozzolan particles during or after said grinding of the pozzolan particles.

7. The method according to claim 5, comprising the further step of adding at least one of water reducing agents, set time regulators, and strength accelerating admixtures in powder form to the pozzolan particles during or after said grinding of the pozzolan particles.

8. The method according to claim 1, comprising the further step of subjecting pozzolan particles to a pre-classification to separate a fraction with a retention on the sieve 45 microns which is at least 99% and in that the oversized particles are grinded to a fineness with a retention on the sieve 30 microns which is less than 5%.

9. The method according to claim 8, comprising the further step of adding Portland cement in the amount up to 10% by weight to the pozzolan particles during or after said grinding of the pozzolan particles.

10. The method according to claim 8, comprising the further step of adding at least one of water reducing agents, set time regulators, and strength accelerating admixtures in powder form to the pozzolan particles during or after said grinding of the pozzolan particles.

11. The method according to claim 1, comprising the further step of adding Portland cement in the amount up to 10% by weight to the pozzolan particles during or after said grinding of the pozzolan particles.

12. The method according to claim 11, comprising the further step of adding at least one of water reducing agents, set time regulators, and strength accelerating admixtures in powder form to the pozzolan particles during or after said grinding of the pozzolan particles.

13. The method according to chain 1, comprising the further step of adding at least one of water reducing agents, set time regulators, and strength accelerating admixtures in powder form to the pozzolan particles during or after said grinding of the pozzolan particles.

* * * * *

(12) EX PARTE REEXAMINATION CERTIFICATE (9th)
Ex Parte Reexamination Ordered under 35 U.S.C. 257

United States Patent
Ronin et al.

(10) Number: US 7,669,790 C1
(45) Certificate Issued: Aug. 27, 2014

(54) METHOD FOR PROCESSING OF POZZOLANS

(75) Inventors: Vladimir Ronin, Luleå (SE); Clinton W Pike, Sr., Cypress, TX (US); Igor Ronin, Luleå (SE)

(73) Assignee: Procedo Enterprises Etablissement, Vaduz (LI)

Supplemental Examination Request:
No. 96/000,039, Nov. 19, 2013

Reexamination Certificate for:
Patent No.: 7,669,790
Issued: Mar. 2, 2010
Appl. No.: 11/942,891
Filed: Nov. 20, 2007

(30) Foreign Application Priority Data

Nov. 12, 2007 (SE) .................................... 0702483-9

(51) Int. Cl.
*B02C 19/00* (2006.01)

(52) U.S. Cl.
USPC .................. 241/22; 241/24.1; 241/29; 241/30

(58) Field of Classification Search
None
See application file for complete search history.

(56) References Cited

To view the complete listing of prior art documents cited during the supplemental examination proceeding and the resulting reexamination proceeding for Control Number 96/000,039, please refer to the USPTO's public Patent Application Information Retrieval (PAIR) system under the Display References tab.

*Primary Examiner* — Jeffrey L. Gellner

(57) ABSTRACT

Method for processing of pozzolans comprising fly ash such as Class F and/or Class C ash used for preparation of mortars and concretes, characterized in, that the pozzolans is subjected to a high energetic mechanical processing by means of grinding in a grinding equipment to a fineness of the final product with a retention on a sieve 30 microns being less than 5%, whereby the pozzolan particles receive mechanical impulses when non-cenosphere in the form of coarse scoria particles are disintegrated and whereby the surface of cenosphere grinded particles is activated.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-13 is confirmed.

\* \* \* \* \*

(12) EX PARTE REEXAMINATION CERTIFICATE (18th)
Ex Parte Reexamination Ordered under 35 U.S.C. 257

United States Patent
Ronin et al.

(10) Number: US 7,669,790 C1
(45) Certificate Issued: Jan. 27, 2015

(54) METHOD FOR PROCESSING OF POZZOLANS

(75) Inventors: Vladimir Ronin, Luleå (SE); Clinton W Pike, Sr., Cypress, TX (US); Igor Ronin, Luleå (SE)

(73) Assignee: Procedo Enterprises Etablissement, Vaduz (LI)

Supplemental Examination Request:
No. 96/000,038, Mar. 10, 2014

Reexamination Certificate for:
Patent No.: 7,669,790
Issued: Mar. 2, 2010
Appl. No.: 11/942,891
Filed: Nov. 20, 2007

(30) Foreign Application Priority Data

Nov. 12, 2007 (SE) .................................... 0702483

(51) Int. Cl.
*B02C 19/00* (2006.01)

(52) U.S. Cl.
USPC ................. 241/22; 241/24.1; 241/29; 241/30

(58) Field of Classification Search
None
See application file for complete search history.

(56) References Cited

To view the complete listing of prior art documents cited during the supplemental examination proceeding and the resulting reexamination proceeding for Control Number 96/000,038, please refer to the USPTO's public Patent Application Information Retrieval (PAIR) system under the Display References tab.

*Primary Examiner* — Jerry L. Gellner

(57) ABSTRACT

Method for processing of pozzolans comprising fly ash such as Class F and/or Class C fly ash used for preparation of mortars and concretes, characterized in, that the pozzolans is subjected to a high energetic mechanical processing by means of grinding in a grinding equipment to a fineness of the final product with a retention on a sieve 30 microns being less than 5%, whereby the pozzolan particles receive mechanical impulses when non-cenosphere in the form of coarse scoria particles are disintegrated and whereby the surface of cenosphere grinded particles is activated.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-13 is confirmed.

\* \* \* \* \*